Patented June 13, 1944

2,351,391

UNITED STATES PATENT OFFICE 2,351,391

PROCESS FOR MANUFACTURING 1,3-ISOQUINOLINEDIOLS

Herman A. Bergstrom, Albany, N. Y., and Walter V. Wirth, Woodstown, N. J., assignors to E. I. du Pont de Nemours & Company, Wilmington, Del., a corporation of Delaware No Drawing. Application January 15, 1943, Serial No. 472,480

4 Claims. (Cl. 260—289)

This invention relates to a novel process for manufacturing 1,3-isoquinolinediols, an intermediate which is useful in making certain types of azo dyes.

The above indicated compound has heretofore been prepared by heating the ammonium salt of homophthalic acid. This process requires heating to a high temperature, such as 240° C. and a great deal of foaming is produced during heating. This results in mechanical losses and losses due to subliming. Recrystallization of the end product is also required in order to separate the 1,3-isoquinolinediol from large and intolerable amounts of other compounds. Even with such recrystallization, the product is not pure, as indicated by an abnormally low melting point. Moreover the process of the prior art requires the separate preparation of dry ammonium homophthalate which is costly and desirable to avoid. All of these operations result in losses and a more economical process is desired.

It is among the objects of the present invention to provide a novel process for making 1,3-isoquinolinediol from homophthalic acid. Another object of the invention is to provide a method in which a relatively pure 1,3-isoquinolinediol product is produced directly. Other objects of the invention will be apparent from the following description.

The objects of the invention are attained in general by ring closing homophthalic acid by heating the same in a solvent in the presence of ammonia.

The invention will be more fully set forth in the following more detailed description which includes examples that are given as illustrative embodiments of the invention and not as limitations thereof. Parts are expressed in parts by weight unless otherwise noted.

Example 1

Charge 220 parts of homophthalic acid into 880 parts of o-dichlorobenzene and heat the slurry to 165°–170° C. until all of the homophthalic acid is in solution. At this temperature bubble ammonia gas into the solution. Water distills off with a little o-dichlorobenzene as the ring closure to 1,3-isoquinolinediol takes place. About 44 parts of ammonia gas are necessary to insure complete ring closure. When all of the homophthalic acid has reacted, the charge is cooled to 20° C. and filtered. The cake is washed with 260 parts of o-dichlorobenzene, followed by warm water to remove all but insignificant amounts of the solvent and other water soluble impurities which may be present, as for instance, some inorganic salts originally contained in the homophthalic acid. The resulting filtered cake composed essentially of 1,3-isoquinolinediol and adherent water may be used wet or it may be dried in an air oven at 80°±5° C. A yield of 179 parts of 1,3-isoquinolinediol is obtained, which is 90.3% of the theoretical amount obtainable from homophthalic acid. The dry product melts at 240°–242° C. as compared to a melting range of 233°–234° C., which is reported in the literature as the melting range of the relatively impure, so-called 1,3-isoquinolinediol produced by prior art processes.

Any non-reactive liquid organic high boiling solvent in which homophthalic acid and 1,3-isoquinolinediol are soluble can be used. The term, high boiling non-reactive liquid organic solvent, in the specification and claims refers only to such solvents which have a boiling point above 140° C. and which do not react with homophthalic acid or 1,3-isoquinolinediol at the reaction temperature to form any considerable amount of other products. As illustrative of such solvents are mentioned amylbenzene, trichlorobenzene and tetraline, but other inert solvents can be used.

The new process can be used to make the mononitro, -chloro and -methyl substituted analogues of 1,3-isoquinolinediol by using the corresponding analogue of homophthalic acid as the start-process of Example 1. The reaction temperature may be varied from about 145° C. to about 255° C., provided the reaction temperature is maintained below the boiling point of the reaction mixture. However, operating temperatures from about 145° C. to a temperature below the subliming point of the product, say 170° C., are preferred. Higher temperatures, however, accelerate the reaction. If desired, the reaction may be carried out under pressure; and when so conducted, a closed vessel is provided having a gas connection for introducing ammonia under pressure into the reaction mixture.

The new process provides an economical and direct method for making the indicated 1,3-isoquinolinediols in a single operation directly from the corresponding homophthalic acid, and of producing a purer product than that produced by prior art methods and one which is substantially pure without subjecting the initial product to recrystallization. In practice, the new process is a more economical method of producing the indicated products than the methods of the prior art which required more than one operation. By the new process, operating temperatures can be employed which are below the subliming temperature of the product sought and losses from this source during processing are avoided.

From the foregoing disclosure it will be recognized that the invention is susceptible of modification without departing from the spirit and scope thereof and it is to be understood that the invention is not restricted to the specific illustrations thereof herein set forth.

We claim:

1. The process of making a 1,3-isoquinolinediol which comprises treating with ammonia gas a compound of the group consisting of homophthalic acid and its mono-nitro, -chloro and -methyl substituted analogues in solution in a non-reactive liquid organic solvent having a boiling point above 140° C., wherein the reaction mixture is heated to a temperature of at least 145° C. and the ammonia gas is passed into the mixture until the acid is converted to the 1,3-isoquinolinediol.

2. The process in accordance with claim 1 in which homophthalic acid is heated in the liquid organic solvent and 1,3-isoquinolineidol is produced.

3. The process in accordance with claim 1 in which homophthalic acid is heated in the liquid organic solvent and the reaction temperature is about 165° to 170° C.

4. The process in accordance with claim 1 in which homophthalic acid is dissolved in ortho-dichlorobenzene and the solution is heated to 165°–170° C. and ammonia gas is passed into the heated solution until 1,3-isoquinolinediol is formed.

HERMAN A. BERGSTROM.
WALTER V. WIRTH.

CERTIFICATE OF CORRECTION.

Patent No. 2,351,391.　　　　　　　　　　　　　　June 13, 1944.

HERMAN A. BERGSTROM, ET AL.

It is hereby certified that error appears in the printed specification of the above numbered patent requiring correction as follows: Page 1, second column, line 32, for the syllable and hyphen "start-" read --starting material instead of homophthalic acid in the--; and that the said Letters Patent should be read with this correction therein that the same may conform to the record of the case in the Patent Office.

Signed and sealed this 8th day of August, A. D. 1944.

Leslie Frazer (Seal)　　　　　　　　　　　Acting Commissioner of Patents.